April 6, 1926.

C. W. HOOVER 1,579,480

MACHINE FOR FORMING OIL CAKES

Filed April 17, 1922  2 Sheets-Sheet 1

Inventor
Charles W. Hoover,
by Parker & Brockwood,
Attorneys.

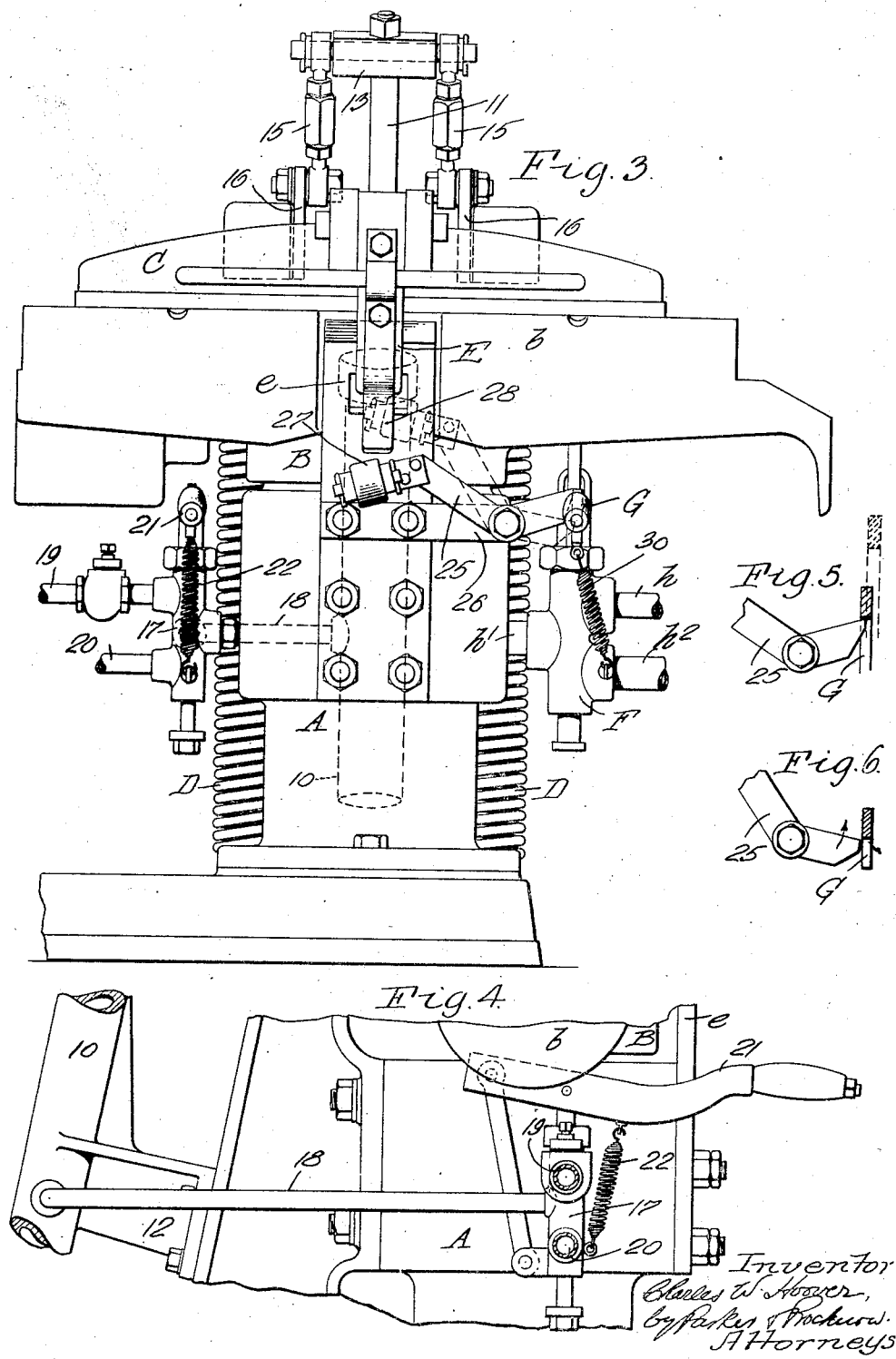

Patented Apr. 6, 1926.

1,579,480

UNITED STATES PATENT OFFICE.

CHARLES W. HOOVER, OF YAZOO CITY, MISSISSIPPI, ASSIGNOR, BY MESNE ASSIGNMENTS, TO THE FRENCH OIL MILL MACHINERY CO., OF PIQUA, OHIO, A CORPORATION OF OHIO.

MACHINE FOR FORMING OIL CAKES.

Application filed April 17, 1922. Serial No. 553,970.

*To all whom it may concern:*

Be it known that I, CHARLES W. HOOVER, a citizen of the United States, residing at Yazoo City, in the county of Yazoo and State of Mississippi, have invented a new and useful Improvement in Machines for Forming Oil Cakes, of which the following is a specification.

This invention relates to machines for forming oil-bearing meal into cakes, suitable for placing into presses for expressing the oil from the meal, and more particularly to improvements in cake-forming machines of the type disclosed in Letters Patent No. 1,202,824, granted October 31, 1916, to Alfred W. French. In the machine disclosed in said patent, the cake is formed by pressing the meal in a cake mold or forming box, to which the meal is delivered by a reciprocating charge box that receives a charge of meal from the meal cooker and deposits it in the cake mold. The cake mold is arranged at the upper end of a ram, between which and a head block above the ram, the cake is pressed. The head block is hinged to swing upwardly from its pressing position over the ram, to permit the filling of the cake mold, and after the charge of meal has been deposited in the cake mold, the head block is lowered by hand from its raised position and is held down in its pressing position by a latch. A valve is then operated to admit liquid under pressure to the ram cylinder for moving the ram to press the cake. After actuating the valve to retract the ram, the latch is moved by hand to release the head block, and the latter is moved to its raised position by springs connected to the rearwardly extending hinge arms of the head block. In said patented machine, it is thus necessary to pull the head block down by hand in opposition to the springs which raise the head block.

One object of this invention is to provide safe and practical means of simple construction which can be readily applied at small expense to a cake forming machine of the sort above mentioned and whereby the lowering of the head block to its pressing position, and the actuation of the latch to permit the head block to return to its raised position can be effected with the minimum exertion and without danger to the operator.

Another object of the invention is to provide an actuating device for the head block latch which is arranged so as to be operated by the movement of the lever or handle for the valve which controls the pressure liquid for actuating the cake forming ram.

Another object is to arrange the levers or handles that control the operation of the cake forming ram and the head block lowering device so that both hands of the operator are used in actuating these handles or levers in such a way as to minimize the danger of either of the operator's hands being injured in the operation of the machine.

In the accompanying drawings:

Fig. 3 is a front elevation thereof.

Fig. 4 is a fragmentary elevation of the opposite side of the machine from that shown in Fig. 1.

Figs. 5 and 6 are detail sectional elevations showing different positions of the actuating device for the head block latch.

Figure 1:
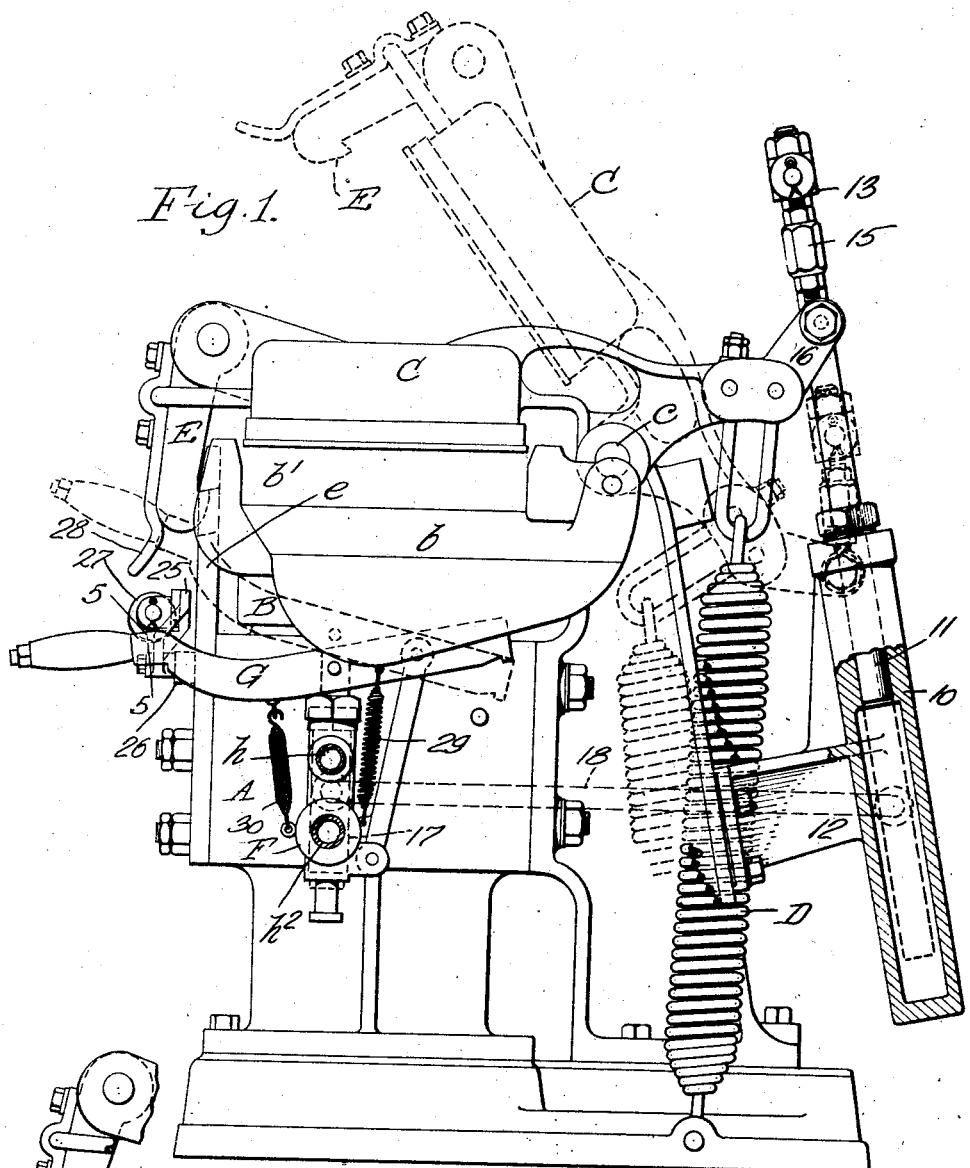
Fig. 1 is a side elevation of a cake forming machine embodying the invention.
Figure 2:
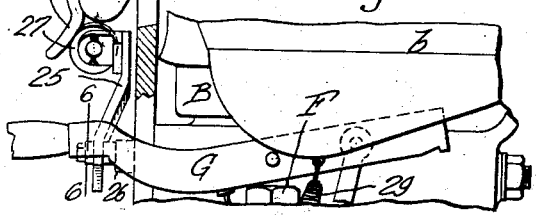
Fig. 2 is a fragmentary side elevation thereof, showing the head block latch released.

A represents the upright ram cylinder, B the ram and C the head block of a cake forming machine. The ram is moved vertically in the cylinder by oil or other liquid under pressure, admitted to the latter for pressing the cake between the ram and head block, the ram being provided with a horizontally extending upper portion $b$ having formed therein a cavity or mold $b'$ in which the meal is deposited and is pressed to form the cake. The head block C is hinged at $c$ to the stationary frame of the machine and is adapted to be swung up and held in the raised position, indicated by dotted lines in Fig. 1, by springs D connected at their upper ends to the rearwardly extending hinge arms of the head block, and connected at their lower ends to the base of the machine. The head block is releasably secured in a horizontal position above the ram for cooperation with the latter to form the cake by a gravity actuated latch E pivoted to the front end of the head block and adapted to engage in a hole in a keeper or member $e$ attached to the front of the ram cylinder. The oil or other liquid under pressure is admitted to the ram cylinder A for actuating the ram, by means of a valve F of known construction, which is preferably actuated by an operating lever or handle G. This lever extends forwardly at one side of the machine, and when the front end of the lever is raised, the valve admits the pressure liquid from a supply pipe $h$, through a pipe $h'$, into the ram cylinder for raising the ram, and when the front end of the lever is depressed the valve F permits the escape of the oil from the ram cylinder through the pipe $h'$, the valve and a discharge pipe $h^2$, thus permitting the descent of the ram after the cake has been pressed. The machine as thus far described is constructed and operates substantially as more fully disclosed in said patent. Other parts of said patented machine which are not necessary to an understanding of this invention are not herein described.

The improvements forming the subject-matter of this invention are as follows:—

The head block B is lowered from its raised position to its horizontal or pressing position by a fluid pressure actuated device, preferably comprising a cylinder 10 which is stationarily mounted in any suitable manner on the machine at the rear thereof, and a piston 11 arranged to reciprocate in this cylinder and connected at its upper end to rearwardly extending arms on the head block. As shown, the cylinder 10 is formed with a bracket extension 12 which is bolted to the rear side of the upright stationary frame of the machine, and the piston 11 is provided at its upper end with a cross head 13 which is pivoted to the upper ends of links 15 which are pivoted at their lower ends to arm extensions 16 which are rigidly attached in any suitable manner to the rearwardly projecting hinge arms of the head block. The links 15 are preferably made with turn buckles for adjusting the lengths of the links. Oil or other liquid under pressure is admitted to the cylinder 10, to raise the piston 11 and lower the head block, by means of a valve 17 of usual or any suitable construction, which is preferably arranged at the left hand side of the machine, and is connected by a pipe 18 to the cylinder 10. 19 and 20 represent respectively supply and discharge pipes connecting with the valve 17. The valve is operated to admit the pressure liquid to and discharge it from the cylinder preferably by a hand lever 21 which extends forwardly from the valve. In the normal position of this lever, in which it is preferably held by a spring 22, the cylinder 10 is connected with the discharge pipe 20 so as to permit the escape of the liquid from the cylinder and the lowering of the piston 11 therein. If the front end of the valve-operating lever 21 is raised, the valve 17 will close the outlet pipe and admit the liquid from the supply pipe 19 through the pipe 18 into the cylinder, and thus raise the piston 11 and lower the head block. When the head block is thus lowered, the gravity latch E automatically engages its keeper and holds the head block down. When the lever 21 is released after lowering the head block, the spring 22 will return the valve 17 to position to permit the escape of the liquid from the cylinder 10 so that the piston can descend to allow the head block to be raised by its springs D.

The latch-releasing mechanism is preferably constructed as follows:

25 represents a lever which is suitably pivoted on a bracket 26 or other stationary part at the front of the machine. One end of this lever extends toward and is adapted to be engaged by the operating lever G for the ram-controlling valve F, and the other end of the lever 25 projects to a position below the latch E and preferably has mounted thereon an anti-friction roller 27 adapted to engage a cam extension 28 on the latch E. This cam extension is preferably formed by a metal strap bolted on the latch and provided with a bent end extending downwardly and outwardly from the lower end of the latch. When the ram controlling lever G is lifted to admit the pressure liquid to the ram cylinder for pressing the cake, the lever will pass by the adjacent end of the latch-actuating lever 25, which will swing upwardly sufficiently to permit the passage of the controlling lever. After the cake has been formed and the controlling lever G is again depressed, preferably by a returning spring 29 for the lever, to permit the descent of the ram, the controlling lever will engage and depress the adjacent end of the latch-actuating lever 25, thereby moving the roller on the other end of the lever into engagement with the cam extension of the latch and disengaging the latch from its keeper. This releases the head block, which will then be swung upwardly to its raised position by the springs D. In addition to the usual spring 29 for returning the lever G to its lower position, a second spring 30 is preferably connected to the lever. The latter spring is arranged so as to exert an outward as well as a downward pull on the lever, thereby tending to disengage the controlling lever G from the latch-actuating lever 25 at the completion of the latch-releasing movement of the latter, so that the lever 25 can return to its initial position. At the time when the latch E is released by its actuating lever 25, as explained, the cylinder 10 of the head block lowering mechanism is connected with the liquid discharge, as before mentioned, so that the piston 11 is free to descend in the cylinder and permit the raising of the head block. In the upward movement of the head block the piston 11 and cylinder 10 act as a dash pot or check and insure an easy or gentle stopping of the head block in its raised position.

It will be noted that by the described construction of the machine the springs D act to raise the head block and hold it up, and the head block can be lowered only by pulling it down by hand, or by operating the valve 17 to admit actuating liquid to the cylinder 10. There is, therefore, no danger of the head block being lowered accidentally and injuring the operator, as could happen in an arrangement in which the head block is raised and held up by pressure-actuated mechanism and could fall in the event of a failure or decrease in the actuating pressure. Furthermore, by the arrangement of the hand operating levers G and 21 at opposite sides of the machine and designed to be operated as described, both hands of the operative are occupied at points away from the head block and ram where they are not liable to be injured by the operation of the machine.

I claim as my invention:

1. In an oil cake forming machine, the combination with a ram and a head block which cooperate to press the cake, said head block being mounted to swing out of pressing position to permit the introduction of the cake material between the ram and head block, and a latch for releasably holding the head block in pressing position, of a hand controlled device which is movable for operating the machine to press the cake, a latch-actuating device which is arranged adjacent to said controlling device and is actuated thereby to release the latch when said controlling device is moved after the cake is pressed, and means for raising the head block when released.

2. In an oil cake forming machine, the combination with a ram and a head block which cooperate to press the cake, said head block being mounted to swing out of pressing position to permit the introduction of the cake material between the ram and head block, and a latch for releasably holding the head block in pressing position, of a controlling device which is movable for operating the ram, means for raising the head block out of pressing positions, and a device which is independent of said head-block-raising means and is actuated by said controlling device for actuating said latch to release the head block after the cake has been pressed.

3. In an oil cake forming machine, the combination with a ram and a head block which cooperate to press the cake, said head block being mounted to swing out of pressing position to permit the introduction of the cake material between the ram and head block, and a latch for releasably holding the head block in pressing position, of a valve controlling a fluid under pressure for operating the ram, an operating member for said valve, a latch-actuating device adjacent said operating member and arranged to be moved thereby to release the latch when said operating member is moved for retracting the ram after pressing the cake, and means for raising the head block when released.

4. In an oil cake forming machine, the combination with a ram and a head block which cooperate to press the cake, said head block being mounted to swing out of pressing position to permit the introduction of the cake material between the ram and head block, and a latch for releasably holding the head block in pressing position, of a valve controlling a fluid under pressure for operating the ram, an operating lever for said valve having a forwardly extending handle, a latch-actuating lever arranged adjacent to said valve-operating lever to be engaged and moved thereby to release the latch when said valve-operating lever is moved for retracting the ram after pressing the cake, and means for raising the head block when released.

5. In an oil cake forming machine, the combination with a ram and a head block which cooperate to press the cake, said head block being mounted to swing out of pressing position to permit the introduction of the cake material between the ram and head block, a latch for releasably holding the head block in pressing position, and means for swinging the head block out of pressing position, of means for lowering the head block, a hand controlled device for controlling the operation of the ram, and a hand controlled device for controlling the operation of said means for lowering the head block, said controlling devices having actuating handles disposed at opposite sides of the front portion of the machine in positions to be grasped by the two hands of the operator.

6. In an oil cake forming machine, the combination of a ram and a head block which cooperate to press the cake, said head block being mounted to swing upwardly away from the pressing position to permit the introduction of the cake material between the ram and head block, a latch for releasably holding the head block in pressing position, a spring for raising the head block when released from said latch, and fluid-pressure-actuated mechanism for lowering the head block to the pressing position, said fluid pressure-actuated mechanism acting as a check to gently arrest the upward movement of the head block by the spring.

CHARLES W. HOOVER.